(12) United States Patent
Schaty (10) Patent No.: US 6,371,707 B1
(45) Date of Patent: Apr. 16, 2002

(54) ASSEMBLY SYSTEM COMPRISING A FASTENING BOLT AND METHOD FOR CREATING AN ASSEMBLY SYSTEM

(75) Inventor: Harald Schaty, Wetzlar (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/402,967
(22) PCT Filed: Apr. 15, 1998
(86) PCT No.: PCT/EP98/02203
§ 371 Date: Feb. 7, 2000
§ 102(e) Date: Feb. 7, 2000
(87) PCT Pub. No.: WO98/48182
PCT Pub. Date: Oct. 29, 1998

(30) Foreign Application Priority Data

| Apr. 17, 1997 | (DE) | 297 06 962 U |
| Apr. 28, 1997 | (DE) | 297 07 663 U |
| Sep. 10, 1997 | (DE) | 297 16 236 U |
| Mar. 20, 1998 | (DE) | 198 12 367 |

(51) Int. Cl.$^7$ ............ F16B 21/00; F16B 37/06; F16B 37/16
(52) U.S. Cl. ............ 411/339; 411/41; 411/171; 411/324
(58) Field of Search ............ 411/41, 45, 46, 411/48, 171, 324, 338, 339, 512

(56) References Cited

U.S. PATENT DOCUMENTS

| 1,187,714 A |   | 6/1916  | Corey |
| 3,288,190 A |   | 11/1966 | Holmes |
| 3,339,953 A | * | 9/1967  | Bohn ............ 411/339 X |
| 4,518,297 A |   | 5/1985  | Kraus |
| 4,571,136 A |   | 2/1986  | Peek |
| 4,770,582 A |   | 9/1988  | Junemann et al |
| 4,780,037 A |   | 10/1988 | Payne |
| 4,850,778 A |   | 7/1989  | Clough et al. |
| 4,878,791 A | * | 11/1989 | Kurihara et al. ......... 411/41 X |
| 4,899,964 A |   | 2/1990  | Sick |
| 4,922,587 A |   | 5/1990  | Pettit |
| 4,981,323 A |   | 1/1991  | Dowd et al. |
| 5,030,051 A | * | 7/1991  | Kaneko et al. ........... 411/41 X |
| 5,598,994 A |   | 2/1997  | Olewinski et al. |
| 5,820,323 A |   | 10/1998 | Barandun |
| 5,947,669 A |   | 9/1999  | Schaty |

FOREIGN PATENT DOCUMENTS

| DE | 296 20 020  | 2/1971 |
| DE | 295 16 868  | 10/1995 |
| DE | 296 11 741  | 11/1996 |
| WO | WO 98/48182 | 10/1998 |

OTHER PUBLICATIONS

NPR Insulation/Carpet Clips—Emhart Fastening Teknologies (believed to have been offered for sale or publicly used prior to 1997).
International Search Report for PCT/EP98/02203, 2 pages, dated Sep. 25, 1998.

* cited by examiner

Primary Examiner—Neill Wilson
(74) Attorney, Agent, or Firm—Harness, Dickey & Pierce, P.L.C.

(57) ABSTRACT

The subject matter of the invention relates to an assembly system with fastening stud as well as to a method of forming an assembly system. The assembly system comprises a fastening stud (1) and an assembly part (20) mounted on the fastening stud (1). The assembly part (20) has a receiving space (21) for receiving the fastening stud (1). When the assembly part (20) has been mounted, the inner surfaces of the receiving space (21) and the outer surface of the fastening stud (1) are frictionally connected to one another. The fastening stud (1) has a frontal opening. The fastening stud (1) is radially resilient at least in the region of the opening. The assembly system comprises a clamping member (14) which, after the assembly part (20) has been mounted onto the fastening stud (1), is movable from a first position outside of the fastening stud (1) into a second position inside the fastening stud (1) so that the clamping member (14) in the second position is insertable without clearance or with little clearance into the opening.

30 Claims, 4 Drawing Sheets

ASSEMBLY SYSTEM COMPRISING A FASTENING BOLT AND METHOD FOR CREATING AN ASSEMBLY SYSTEM

LIST OF REFERENCE NUMERALS 1 fastening stud
2 groove
3 outer peripheral surface
4 frontal opening
5 structure
7 raised portion (stud)
8 slot
9 axial window
10 assembly part
11; 21 receiving space
12; 22 wall
13; 23 raised portion (assembly part)
14 clamping member
15 end of receiving space
16 mushroom-like head
17 screwdriver slot
18; 28 inner surface
20 assembly part
24 gap
25, 26 line clip
27 locking element
29, 30 resilient enclosure
31 longitudinal opening
32, 33 supporting element
34 first foot
35 second foot
36 first bead
37 second bead
38 first groove
39 second groove
40 component
41 material connection
42 through-opening
43 head
44 recess

BACKGROUND AND SUMMARY OF THE INVENTION

The invention relates to an assembly system having a fastening stud and an assembly part mountable thereon as well as to a method of forming an assembly system. The assembly part may be, in particular, a holder for fastening lines to components of an automobile. The fastening stud may preferably be a weld stud, in particular a radially resilient hollow stud.

Assembly systems having a fastening stud and an assembly part mountable thereon are known. During mounting of the assembly part, the material of the assembly part is plastically deformed. The fastening studs usually have a textured surface, the raised portions of which may, even after the mounting process, continue to press into the material of the fastening part, particularly when the material is plastic material.

From DE-GM 296 20 020 and DE-GM 296 11 741 assembly systems are known, in which the fastening stud is a weld stud having an external thread. The weld stud is, as a rule, solid.

From DE-GM 295 16 868 an assembly system is known, in which an assembly part is mounted onto an externally profiled gudgeon formed on a structure. A two-dimensional material may be introduced into lateral recesses in the assembly part and/or between the head of the assembly part and the structure so that the two-dimensional material is fixed to the structure. Such an assembly system is used particularly in the motor vehicle industry for fastening carpets, floor mats, insulating mats and the like of relatively complex geometries to a structure such as, for example, a vehicle body. The assembly parts of such assembly systems are also known as fastening clips.

From WO 94/03735 a hollow, sleeve-like fastening stud is known, which is capable of resilient compression and expansion in a radial direction. By utilising the resilience, various types of assembly part may be mounted on the fastening stud. The hollow fastening stud is weldable by one axial end to a structure. In a specific embodiment, the fastening stud has an external thread. Also known from WO 94/03735 are assembly parts which are mountable onto the fastening stud, in particular assembly parts which may be secured in their assembled state of connection to the fastening stud by means of a locking element insertable into the interior of the sleeve-like fastening stud, thereby preventing a radial compression of the fastening stud. In a special embodiment, the fastening stud has lateral indentations or holes, into which projections of correspondingly shaped assembly parts may latch or engage, thereby securing an assembly connection. Mounting of the assembly part is effected utilising the resilience of the fastening stud in radial direction.

From DE 38 02 698 C2 a line holder mountable onto a profiled stud or gudgeon is known, which comprises a plurality of receivers in the shape of a graduated circle for receiving lines. After lines have been inserted, the retaining connection is closed by mounting a wedge-type bracket over the receiver openings.

The object of the present invention is to indicate a method of forming an assembly system, in which the assembly part is easy to mount onto the fastening stud but hard to pull off.

By fastening studs in the context of the present specification are meant not only solid studs but any fastening parts having stud-like external contours, in particular also the sleeve-like, radially resilient fastening studs described above, which are fastenable to a structure or formed on the structure in the manner of a gudgeon.

A further object of the invention is to indicate an assembly part for such an assembly system.

In accordance with the present invention an assembly part having a receiving space is mounted onto a fastening stud, which is radially resilient at least in the region of a frontal opening. The assembly part is mounted in such a way onto the fastening stud that the fastening stud projects into the receiving space. A clamping member is then moved from a first position outside of the fastening stud into a second position inside the fastening stud. The clamping member in the second position projects without clearance or with little clearance into the opening of the fastening stud. The inner surface of the receiving space and the outer surface of the fastening stud form a frictional connection. The connection between the assembly part and the fastening stud may be achieved with a relatively low expenditure of force. By virtue of the fact that the clamping member projects into the fastening stud, the fastening stud is pressed radially outwards by the clamping member, thereby forming between the fastening stud and the assembly part a very good frictional connection which may be released only with a considerable expenditure of force.

According to an advantageous embodiment of the method, it is proposed that before or after a movement of the clamping member the assembly part is fitted to at least one component.

The formation of an assembly system may also be simplified by the clamping member being connected by a material connection, in particular integrally, to the assembly part. During the movement of the clamping member from a first position outside of the fastening stud into a second position inside the fastening stud, the clamping member is separated from the assembly part. This means that the material connection between the assembly part and the clamping member is broken, enabling a new positive engagement or frictional connection to form between the clamping member and the assembly part. Because the clamping member and the assembly part form a structural unit, there is substantially only one part which has to be manipulated. The proposed procedure lends itself particularly well to automation because only one component has to be manipulated.

According to a further advantageous embodiment of the method, it is proposed that, after the assembly part has been mounted onto the fastening stud, a locking element firmly connected to the clamping member is moved from a first position outside of the fastening stud so far into a second position inside the fastening stud that the locking element in the second position acts at least at two opposing points upon the outer periphery of a wall of the receiving space. Said embodiment has the advantage that the locking element exerts upon the wall a radially inwardly directed force, by means of which the frictional connection between the fastening stud and the receiver is enhanced. It is therefore even more difficult to pull the assembly part from the fastening stud.

In the assembly system according to the invention, the fastening stud is at least partially radially resilient. Said property is preferably achieved by designing the fastening stud in the manner of a sleeve having a slot extending substantially in longitudinal direction. The resilience of such a fastening stud may be increased by at least one axial window, which extends over part of the axial length of the fastening stud. The receiving space of the assembly part is preferably fashioned in such a way that the fastening stud during the mounting process is radially compressed. Because of the resilience of the latter, outwardly directed restoring forces arise, by means of which optionally a frictional connection is achieved between the fastening stud and the assembly part.

In the assembly system according to the invention, the fastening stud has a frontal opening. The assembly system moreover comprises a clamping member which is insertable without clearance or with little clearance into the opening of the stud. The clamping member is preferably connected to the assembly part. After the assembly part has been mounted onto the fastening stud, the clamping member is moved from a first position outside of the fastening stud into a second position inside the fastening stud. During said process, the clamping member is introduced into the frontal opening of the fastening stud so that the sleeve-like fastening stud is spread apart and the forces acting outwards substantially at right angles to the peripheral surfaces are considerably intensified or such forces are generated. By means of said forces a frictional connection between the assembly part and the fastening stud is achieved. The clamping member is also frictionally connected to the fastening stud so as to be substantially protected against loss.

In a further embodiment, the clamping member prior to the mounting process is connected to the assembly part by a thin material connection which tears when the clamping member is introduced into the openings. In said manner, a simple and reliable assembly of such an assembly part is possible, in which the assembly part is assembled by means of two deliberate pushing actions. By means of the first pushing action, the assembly part is mounted onto the fastening stud without driving the clamping member through the opening into the interior of the fastening stud. With the second pushing action, the clamping member is then driven home.

In a further advantageous development of the assembly system, the assembly part forms a line holder. The assembly part has, particularly at opposite sides of the receiving space for receiving the fastening stud, in each case one line clip for clipping in lines of appropriate cross section. The line clips are preferably flexible. The assembly part is manufactured by injection moulding from plastic material and preferably has a structure comprising a plurality of raised portions, which extend at right angles to the peripheral direction of the wall and/or fastening stud, i.e. in longitudinal direction, and are formed on an inner surface of the wall in the form of longitudinal ribs.

According to a development, the assembly part comprises a locking element for securing the retaining connection between the line clips and a clipped-in line. After the line holder has been mounted onto the fastening stud, the locking element is movable from a first position, in which it allows a line to be clipped in, into a second position, in which it restricts the flexibility of the line clip. In other embodiments of the assembly part according to the invention, the assembly part is a line holder having only one or more than two line clips.

In the special embodiment of the assembly part, the line clips and the wall of the receiving space, in each case at sides lying opposite one another, delimit a gap which the locking element in the second position at least approximately fills.

It is advantageous that the line clips comprise a resilient enclosure for holding a line portion and having in each case a longitudinal opening for clipping-in of the line. The line clips preferably comprise a bridge-like resilient supporting element, which is connected by a first foot in a region along a longitudinal opening to the enclosure and by a second foot in a region substantially opposite the longitudinal opening to the enclosure. The supporting element delimits the gap.

The flexibility of the line clips in the second position of the locking element is restricted in that the locking element limits or prevents a yielding of the supporting element and hence prevents an increase in the size of the longitudinal opening which would allow unclipping of a line. The embodiment has the particular advantage that the retaining connection between the line clips and any line clipped therein is securable by means of a locking element of an extremely simple design. In contrast, locking elements of a complex configuration, which are specially adapted to the respective enclosure for holding a line portion, are known from prior art, e.g. from DE 38 02 698.

Also of advantage is a special embodiment of the locking element and the wall of the receiving space. The wall preferably has a first and a second bead extending externally in a peripheral direction, the beads in particular being formed parallel to and spaced apart from one another. The first bead is preferably disposed substantially at the top end of the wall. In the first and second position of the locking element, the latter embraces the wall. The locking element has a first and a second groove so that in the first position the first bead is latchable into the second groove and in the second position the first bead is latchable into the first groove and the second bead is latchable into the second groove. In an alternative embodiment, the beads are formed on the locking element and the grooves are formed in the wall. In yet another alternative embodiment, the locking cap does not embrace the wall but acts at least at two opposing points upon the outer periphery of the wall.

The clamping member is preferably integrally formed with the locking element. The clamping member, when it is inserted in the second position of the locking element in a top frontal opening of a sleeve-like fastening stud, prevents a radial springing-together of the fastening stud at least in the top region of the fastening stud. Upon penetration of the clamping member into a sleeve-shaped interior, the fastening stud is spread radially apart with a simultaneous intensification of its resilient restoring forces so that optionally a burr on the outer lateral surface of the fastening stud presses into longitudinal ribs of the receiver. The locking element may, besides the function of securing the retaining connection between the line clips and the lines, also perform the function of securing the assembly connection between the assembly part and the fastening stud. The mounting of the locking element is preferably reversible.

In a development of the assembly part, in particular as a line holder, the line holder is mountable at both ends onto the fastening stud. Given such an embodiment of the assembly part, the line holder is fashioned in such a way as to be mountable selectively with one of the two opposing openings of its receiving space first onto the fastening stud. However, the material connections between the wall of the receiving space and the line clips are disposed further in the middle of the axial length of the wall so that the locking element is mountable from both ends of the receiving space. The line clips are moreover designed in such a way the longitudinal openings are easily accessible regardless of the selected mounting direction.

In the assembly system according to the invention, once the assembly part has been mounted, the inner surface of the receiving space of the assembly part and the outer peripheral surface of the fastening stud are at least in places frictionally connected to one another. The outer peripheral surface preferably has a structure comprising at least one burr-like raised portion made of dimensionally stable material extending approximately in a peripheral direction. The inner surface has a structure comprising at least one raised portion made of plastically deformable material extending approximately at right angles to the peripheral direction. Because the burr-like raised portion and the raised portion made of the plastically deformable material extend at right angles to one another, once the assembly part has been mounted there is at least one region of point-like contact so that low forces acting approximately at right angles to the surfaces are sufficient to press the burr-like raised portion into the plastically deformable material. Under the high pressure, the deformable material may continue to flow for a long time after mounting of the assembly part. The pressing-in of the burr-like raised portion produces a locally limited positive engagement connection, making the assembly part difficult to pull off.

In a embodiment of the assembly system, the receiving space is designed in the manner of a channel having two openings lying opposite one another. By virtue of said embodiment, either end of the assembly part may be mounted on the fastening stud. This is advantageous particularly when the assembly system is to be used to fasten components of differing dimensions to a structure. Especially given a embodiment of the assembly part which comprises a head and a stem, which extends out from the head and in the interior of which the receiving space is situated, and in which a component is connectable to the head, the fastening position of the component relative to the structure may be selected. The head of the assembly part may, for example, either rest against the structure or be at a distance from the structure. The assembly part may also be mounted to a differing extent onto the fastening stud. This is where the advantage of the assembly system according to the invention whereby the at least one burr-like raised portion may press at different points into the plastically deformable material, comes in useful. It is therefore no longer necessary to provide assembly parts of various designs for components of differing thicknesses which are to be disposed between a head of the assembly part and the structure.

In particular, the fastening stud is made of metal. It is preferably fastenable by arc stud welding to a metal carrier component. For details in said regard, reference is made to WO 94/037735.

Likewise particularly preferred is a embodiment, in which the fastening stud has an external thread. In said case, the thread groove or the thread grooves are bordered by the at least one burr-like raised portion. By virtue of the external thread, the assembly part after mounting may be disassembled by being unscrewed from the fastening stud. This offers advantages particularly in the field of automobile manufacture because of a recent requirement for materials to be separated into their separate categories when a vehicle is scrapped.

BRIEF DESCRIPTION OF THE DRAWINGS

Embodiments of the assembly system according to the invention and of the assembly part according to the invention are described with reference to the drawings. The invention is however not restricted to the embodiments. The individual figures of the drawings show.

DETAILED DESCRIPTION

Figure 1:
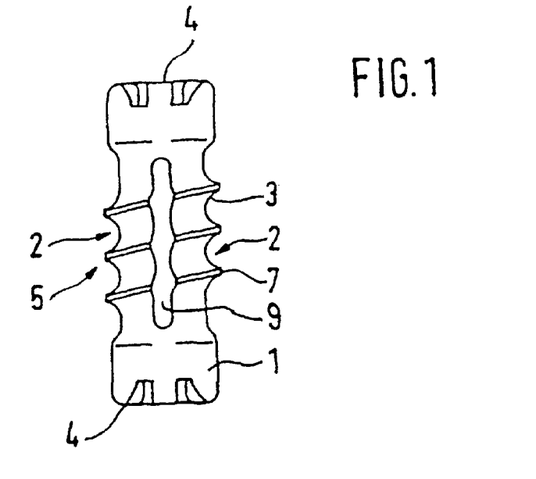
FIG. 1 a diagrammatic side view of a sleeve-like fastening stud with an external thread.
Figure 2:
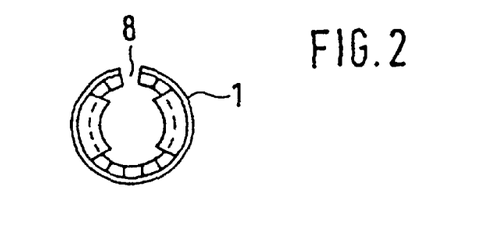
FIG. 2 a plan view of the sleeve-like fastening stud according to FIG. 1.

FIG. 1 and FIG. 2 show a sleeve-like fastening stud 1, in particular a weld stud, which is usable for an assembly system according to the invention but is also suitable for other applications. The weld stud 1 is weldable by either of its sleeve ends to a structure. It has a structure 5 comprising a groove 2 extending round virtually in a peripheral direction and a burr 7, which form an external thread. The groove 2 is bordered by flanks 3. The sleeve-like weld stud 1 is radially resilient by virtue of a continuous slot 8 running from top to bottom. The radial resilience of the weld stud is further increased by an additional axial window 9, which preferably extends over at least half the axial length of the weld stud 1, has a smaller dimension in peripheral direction than in axial direction and is disposed approximately at the opposite side of the weld stud 1 to the slot 8. Two or more of such axial windows may alternatively be provided, which should then together with the slot 8 be distributed substantially uniformly over the periphery. Axial windows 8 are advantageous particularly when the material or the thickness of the wall of the weld stud would otherwise not allow a satisfactory radial resilience. The weld stud 1 has a frontal sleeve opening 4 both at the top and bottom.

Figure 3:
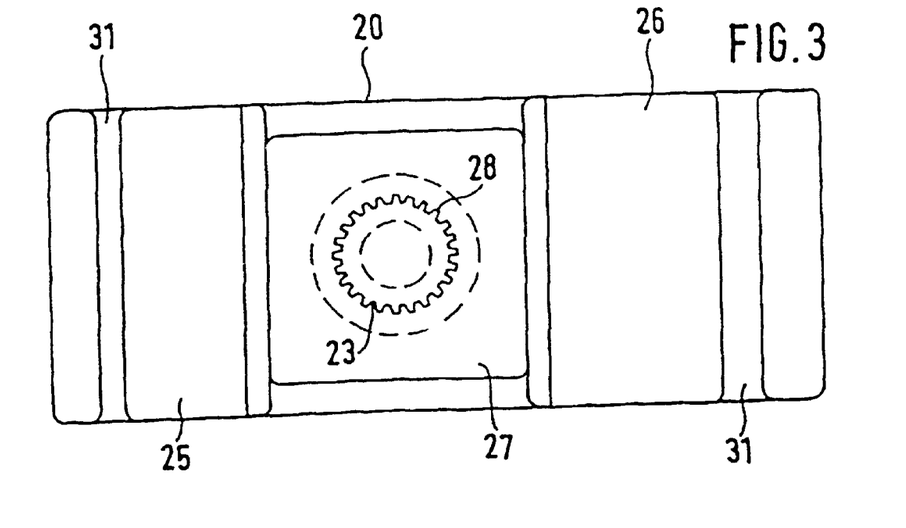
FIG. 3 a plan view of a first embodiment of the assembly part according to the invention.
Figure 4:
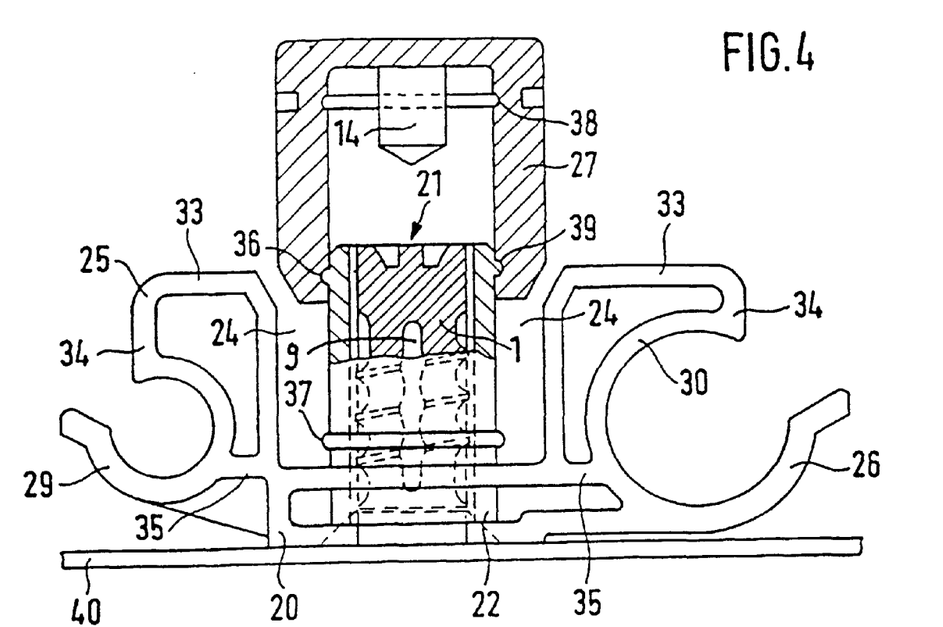
FIG. 4 a side view of the assembly part according to FIG. 3 partially in section during the mounting process onto the fastening stud according to FIGS. 1 and 2.
Figure 5:
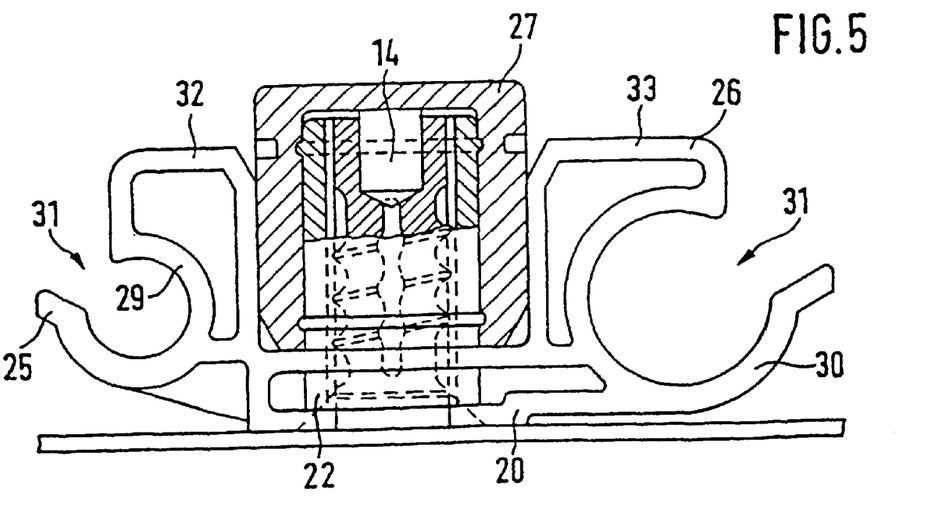
FIG. 5 the mounting process according to FIG. 4 at a later stage.

FIG. 3 to FIG. 5 show a line holder 20 for an assembly system 1; 20 according to the invention. The line holder 20 has, at opposing sides of the receiving space 21 for receiving the weld stud 1, in each case a line clip 25, 26 for clipping in lines of appropriate cross section. The line clips 25, 26 are flexible. The line holder 20 is manufactured by injection moulding from plastic material and has a structure comprising a plurality of raised portions 23, which extend at right angles to the peripheral direction of the wall 22 and/or of the weld stud 1, i.e. in longitudinal direction, and are formed on the inner surface 28 of the wall 22 in the form of longitudinal ribs 23. The line holder 20 further comprises a locking cap 27 for securing the retaining connection between the line clips 25, 26 and a clipped-in line. After the line holder 20 has been mounted onto the weld stud 1, the locking cap 27 is movable from a first position (see FIG. 4), in which it allows a line to be clipped in, into a second position (see FIG. 5), in which it restricts the flexibility of the line clips 25, 26. In other embodiments of the assembly part according to the invention, the assembly part is a line holder having only one or more than two line clips 25, 26. Securing of the retaining connection is effected in said case in the same manner as described here.

In the special embodiment of the line holder 20, the line clips 25, 26 and the wall 22 of the receiving space 21, in each case at sides lying opposite one another, delimit a gap 24 which the locking cap 27 in the second position at least approximately fills.

It is advantageous that the line clips 25, 26 comprise a resilient enclosure 29, 30 for holding a line portion and each having a longitudinal opening 31 for clipping-in of the line. The line clips 25, 26 further comprise a bridge-like resilient supporting element 32, 33, which is connected by a first foot 34 in a region along the longitudinal opening 31 to the enclosure 29, 30 and which is connected by a second foot 35 in a region lying substantially opposite the longitudinal opening 31 to the enclosure 29, 30. The supporting element 32, 33 delimits the gap 24.

In the embodiment of the line holder 20 illustrated in FIG. 3 to FIG. 5, the flexibility of the line clip 25, 26 in the second position of the locking cap 27 is restricted in that the locking cap 27 limits or prevents a yielding of the supporting element 32, 33 and hence prevents an increase in the size of the longitudinal opening 31 which would allow unclipping of a line. The embodiment in particular has the advantage that the retaining connection between the line clips 25, 26 and any line clipped therein is securable by means of a locking element of an extremely simple design. In contrast, locking elements of a complex configuration, which are specially adapted to the respective enclosure for holding a line portion, are known from prior art, e.g. from DE 38 02 698.

Also of advantage is the special embodiment of the locking cap 27 and the wall 22 of the receiving space 21. The wall 22 has a first 36 and a second 37 bead extending externally in a peripheral direction, the beads 36, 37 being formed parallel to and spaced apart from one another. The first bead 36 is preferably disposed substantially at the top end of the wall 22. In the first and second position of the locking cap 27, the latter embraces the wall. The locking cap 27 has a first 38 and a second 39 groove so that in the first position the first bead 36 is latchable into the second groove 39 and in the second position the first bead 36 is latchable into the first groove 38 and the second bead 37 is latchable into the second groove 39. In an alternative embodiment, the beads are formed on the locking cap and the grooves are formed in the wall. In yet another alternative embodiment, the locking cap does not embrace the wall but acts at least at two opposing points upon the outer periphery of the wall.

A further feature of the special embodiment is the provision of a pin 14 which, in the second position of the locking cap 27, is inserted as a clamping member in the top frontal sleeve opening 4 of the sleeve-like weld stud 1 and prevents a radial springing-together of the weld stud 1 at least in the top region. Upon penetration of the pin 14 into the sleeve interior, the weld stud 1 is pressed radially apart with a simultaneous intensification of its resilient restoring forces so that the burr 7 presses into the longitudinal ribs 23 of the line holder 20. The locking cap 27 therefore, besides the function of securing the retaining connection between the line clips 25, 26 and the lines, also performs the function of securing the assembly connection between the line holder 20 and the weld stud 1. The mounting of the locking cap 27 is reversible. The line holder 20 may be unscrewed from the weld stud 1.

In a further embodiment of a line holder which is not illustrated, the line holder is mountable by either of its two ends onto the fastening stud. In a special such embodiment, the line holder is fashioned in a similar manner to the line holder 20 so that it is mountable with one of the two opposing openings of its receiving space first onto the fastening stud. However, the material connections between the wall of the receiving space and the line clips is disposed further in the middle of the axial length of the wall so that the locking cap is mountable from both ends of the receiving space. The line clips are moreover designed in such a way that the longitudinal openings are easily accessible regardless of the selected mounting direction.

Figure 6:
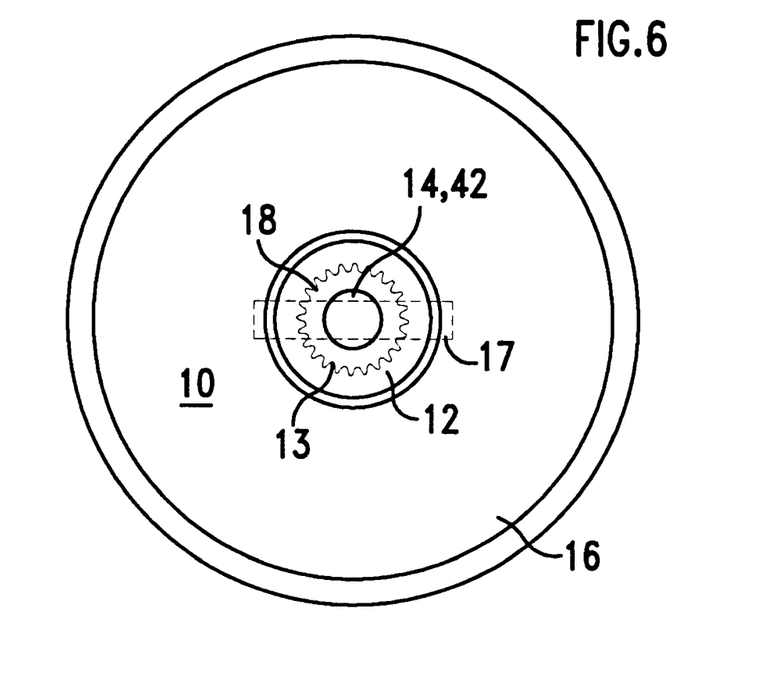
FIG. 6 an inverted plan view of a second embodiment of the assembly part according to the invention, FIG. 7 a side view partially in section of the assembly part according to FIG. 6.
Figure 7:
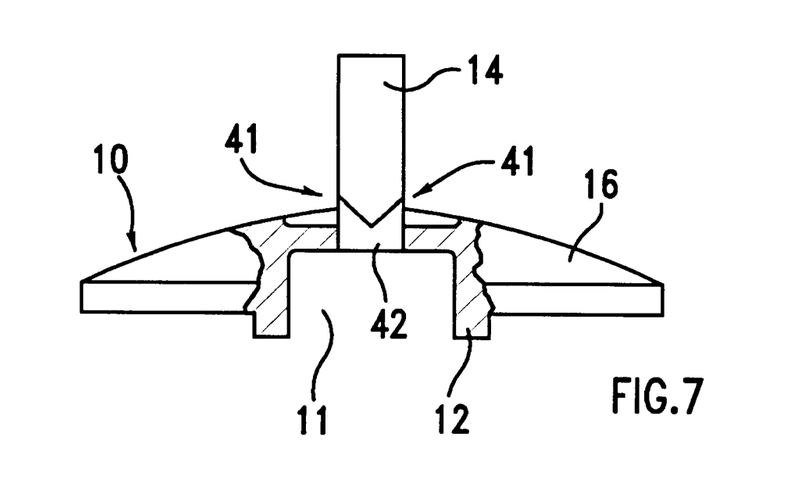
Figure 8:
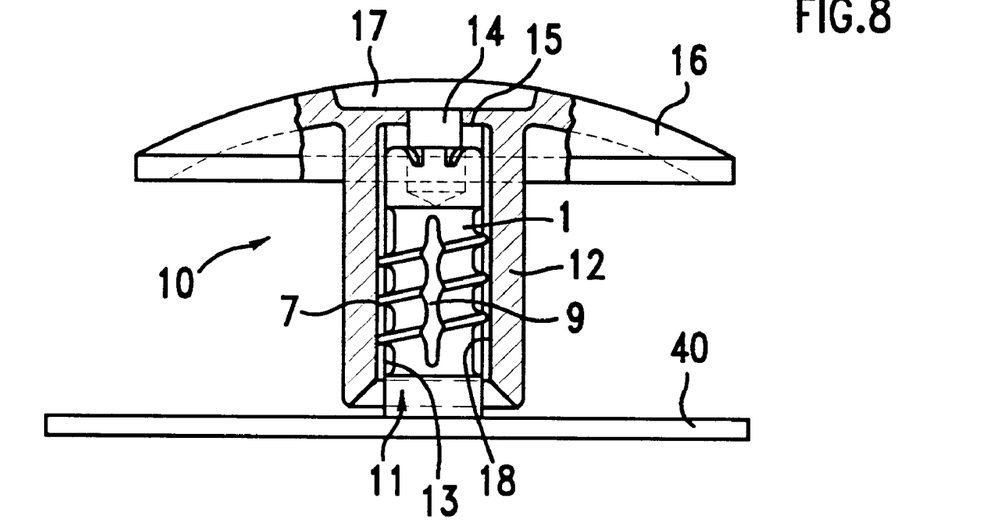
FIG. 8 a side view of the mounted assembly part according to FIG. 6 partially in section and FIG. 9 a side view of a modified assembly part according to FIG. 6 partially in section.

FIG. 6 to FIG. 8 show a further embodiment of an assembly part according to the invention. The assembly part takes the form of a press button 10, which is mountable onto the weld stud 1 and manufactured by injection moulding as an integral part made of plastic material. The weld stud 1 is welded to the body sheet 40. Two-dimensional materials in particular may be situated between the mushroom-like head 16 of the press button 10 and the body sheet 40, said materials then being held fast by the press button 10. The press button 10 has a receiving space 11 for receiving the weld stud 1.

From FIG. 6 it is evident that the inner surface 18 of the receiving space 11 has a structure comprising a plurality of longitudinal ribs 13. The wall 12 of the receiving space 11 has a circular cross section. Formed at the top end of the receiving space 11 is a pin 14 which, when the press button 10 is mounted onto the weld stud 1, presses into the top frontal sleeve opening 4 of the weld stud 1. As a result, in the manner already described above, the radially outwardly acting forces are generated or intensified and lead to the thread burr 7 being pressed into the longitudinal ribs 13. The pressing-in process continues for some time even after the end of the mounting process because the plastic material flows gradually under the pressure of the thread burr 7. The top free end of the head 16 has a screwdriver slot 17 so that the press button 10 may be screwed onto, or unscrewed from, the weld stud 1.

The press button 10 has a through-opening 42, which is formed substantially coaxially with the receiving space 11. A clamping member 14 is disposed above the head 16 of the assembly part 10. The clamping member 14 substantially takes the form of a pin. The external contour of the clamping member 14 substantially corresponds to the internal contour of the through-opening 42. The clamping member 14 is connected by material connections 41 to the assembly part 10. Once the assembly part 10 is disposed on the fastening stud 1, a force directed towards the fastening stud 1 is exerted upon the clamping member 14, thereby destroying the material connections 41. The clamping member 14 is introduced into the opening 4 of the fastening stud 1. After the introduction process, the clamping member 14 has reached its end position, as shown in FIG. 8.

Figure 9:
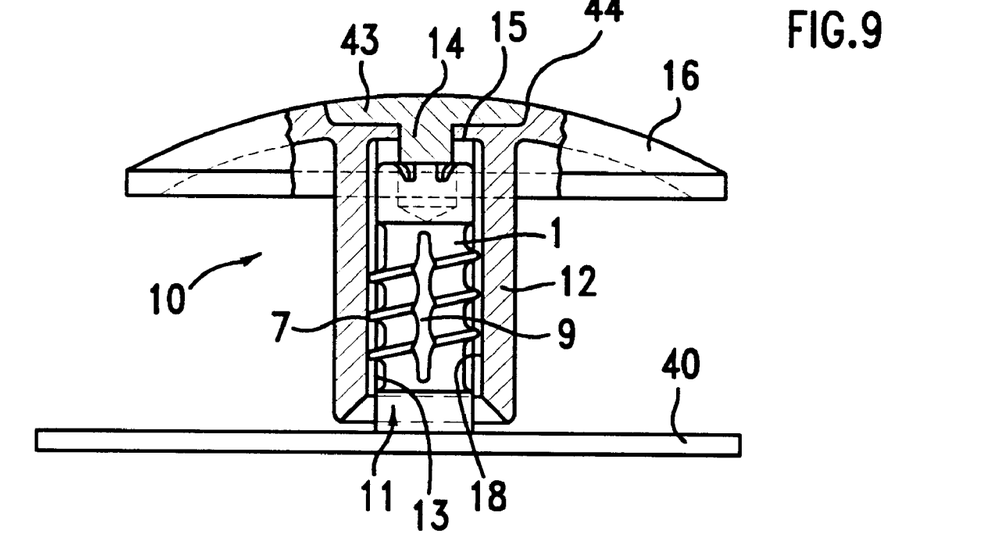

FIG. 9 shows an alternative construction of the clamping member 14. The clamping member 14 has a head 43, which projects into a correspondingly formed recess 44 of the mushroom-like head 16.

In another embodiment of a press button according to the invention which is not illustrated, the receiving space is designed in the manner of a through-channel so that the press button is mountable at either end onto the fastening stud. A clamping member is in said case either not provided or provided as a separate part.

The embodiments of the assembly system according to the invention and of the assembly part according to the invention which are described with reference to the drawings demonstrate by way of example the advantages of the invention. Other assembly parts of a known design may also be used in an assembly system according to the invention, it merely being necessary for the inner surface of the receiving space to be modified according to the invention.

The assembly system according to the invention allows simple fastening of an assembly part to a fastening stud through mounting of the assembly part. By virtue of the fact that dimensionally stable material is pressed at points into plastically deformable material, a reliable connection is provided. The parts of the assembly system according to the invention may be manufactured by slightly modifying known techniques.

What is claimed is:

1. A fastening system comprising:
    a hollow, automotive weld stud having an outer surface and an inner surface;
    a fastener having a substantially hollow shaft projecting from a laterally enlarged mushroom-like head, the shaft having an inside surface;
    the fastener being engagable with the stud such that the inside surface of the shaft contacts against the outer surface of the stud; and
    a clamping member removably located inside the stud to further secure the fastener to the stud, the clamping member being movable relative to the head of the fastener.

2. The fastening system of claim 1 wherein the clamping member includes an elongated pin centrally projecting from a laterally enlarged clamping head.

3. The fastening system of claim 2 wherein the head of the fastener has a recess operable to receive the clamping head.

4. The fastening system of claim 1 wherein the shaft of the fastener has an annular end-view configuration.

5. A fastening system comprising:
    a hollow stud having an outer surface and an inner surface;
    a fastener having a substantially hollow shaft projecting from a laterally enlarged mushroom-like head, the shaft having an inside surface;
    the fastener being engagable with the stud such that the inside surface of the shaft contacts against the outer surface of the stud;
    a clamping member removably located inside the stud to further secure the fastener to the stud; and
    a thread projecting from the outer surface of the stud, the thread being operable to engage the shaft of the fastener when the fastener is attached to the stud.

6. The fastening system of claim 1 wherein the stud includes a longitudinally elongated slot.

7. The fastening system of claim 1 wherein the clamping member includes a tool-receiving slot accessible even when the clamping member is fully engaging the stud.

8. The fastening system of claim 1 wherein the clamping member is rotatable to allow removal of the clamping member from the stud.

9. The fastening system of claim 1 further comprising a frangible connector coupling the clamping member to the head of the fastener prior to full insertion of the clamping member into the stud.

10. The fastening system of claim 1 wherein the stud is metal and the fastener is injection molded from plastic.

11. A fastener assembly comprising:
    a fastener having a laterally enlarged head and a circular cross-sectionally shaped shaft longitudinally projecting from substantially the center of the head, the shaft having an internal cavity and an open end opposite the head, the head having a through-opening allowing access to the cavity of the shaft; and
    a pin longitudinally insertable into the through-opening of the head, the pin removably extending into the cavity of the shaft if fully inserted.

12. The fastening system of claim 11 further comprising a laterally enlarged clamping head, the pin centrally projecting from the clamping head.

13. The fastening system of claim 11 wherein the head of the fastener has a recess operable to receive the clamping head.

14. The fastening system of claim 11 further comprising a tool-receiving slot located on the pin.

15. The fastening system of claim 11 wherein the pin is rotatable relative to the fastener.

16. The fastening system of claim 11 further comprising a breakable connector coupling the pin to the head of the fastener at least prior to movement of the pin relative to the fastener.

17. The fastening system of claim 11 wherein the pin and the fastener are made from an injection molded plastic.

18. The fastening system of claim 11 wherein an elongated external side surface of the pin is substantially smooth and free of threads.

19. A method of attaching a fastener having a clamping member to a weld stud, the method comprising:
    (a) welding the stud to a surface;
    (b) assembling the fastener onto the stud such that a hollow shaft of the fastener engages an outside surface of the stud;
    (c) inserting the clamping member through an opening in the fastener;

(d) inserting the clamping member into an opening in the stud; and (e) removing the clamping member and the fastener from the stud in a manner which is not destructive to at least the fastener and the stud.

20. The method of claim 19 further comprising engaging the clamping member with inwardly projecting metal burrs of the stud.

21. The method of claim 19 further comprising rotating the clamping member to secure the clamping member to the stud.

22. The method of claim 19 further comprising engaging threads of the stud with the shaft of the fastener.

23. The method of claim 19 further comprising securing an automotive vehicle member between a head of the fastener and the surface when the fastener is secured to the stud.

24. A fastening system comprising:

an elongated and hollow member having an outer surface and an inner surface;

a fastener having a pin extending from a cap;

a line clip having a flexible line receptacle and a wall, the receptacle including a flexible arm adjacent an access opening;

the wall substantially surrounding at least a portion of the member; and the cap substantially surrounding at least a portion of the member and at least an end of the pin being located inside the member when the fastener and the line clip are fully assembled to the member.

25. The fastening system of claim 24 further comprising a projection and groove structure at least temporarily securing the cap in a desired position relative to the line clip.

26. The fastening system of claim 24 wherein an inside surface of the receptacle is substantially circular and interrupted by the opening.

27. The fastening system of claim 24 further comprising a second flexible line receptacle attached to the first receptacle, the member being located between the receptacles when coupled together.

28. The fastening system of claim 24 wherein the member is an externally threaded weld stud.

29. The fastening system of claim 24 wherein the cap has a substantially inverted U-cross sectional shape with the pin being coaxial with the center of the cap.

30. The fastening system of claim 24 wherein the member is radially expandable, and the line clip and fastener are made from a plastic material.

* * * * *